United States Patent [19]

Kovach

[11] Patent Number: 5,163,980
[45] Date of Patent: Nov. 17, 1992

[54] WATER REMOVAL FROM HUMID GASES LADEN WITH ORGANIC CONTAMINANTS BY SERIES ADSORPTION

[76] Inventor: J. Louis Kovach, 2948 Brookham Dr., Worthington, Ohio 43085

[21] Appl. No.: 780,926

[22] Filed: Oct. 22, 1991

[51] Int. Cl.⁵ .............................................. B01D 53/04
[52] U.S. Cl. ........................................ 55/31; 55/33; 55/62; 55/68; 55/74
[58] Field of Search ................... 55/25, 26, 31, 33, 62, 55/68, 74

[56] References Cited

U.S. PATENT DOCUMENTS

| | | | |
|---|---|---|---|
| 2,137,605 | 11/1938 | Derr | 55/33 |
| 2,823,764 | 2/1958 | Miller | 55/31 |
| 3,006,438 | 10/1961 | De Yarmett | 55/31 |
| 3,186,144 | 6/1965 | Dow | 55/33 X |
| 3,204,388 | 9/1965 | Asker | 55/31 |
| 3,216,178 | 11/1965 | Sauty | 55/33 |
| 3,355,860 | 12/1967 | Arnoldi | 55/31 |
| 3,487,608 | 1/1970 | Gräff | 55/33 |
| 3,883,325 | 5/1975 | Führing et al. | 55/25 X |
| 3,897,226 | 7/1975 | Doherty | 55/33 |
| 4,259,094 | 3/1981 | Nagai et al. | 55/390 X |
| 4,295,282 | 10/1981 | Fox | 34/27 |
| 4,432,774 | 2/1984 | Jüntgen et al. | 55/25 |
| 4,480,393 | 11/1984 | Flink et al. | 34/27 |
| 4,539,816 | 9/1985 | Fox | 62/87 |
| 4,627,856 | 12/1986 | von Gemmingen | 55/31 |
| 4,732,578 | 3/1988 | Benkmann | 55/26 X |
| 4,846,852 | 7/1989 | Schweitzer et al. | 55/31 |

Primary Examiner—Robert Spitzer
Attorney, Agent, or Firm—Mueller and Smith

[57] ABSTRACT

The present invention relates to an improved adsorption process for recovery of a condensible organic contaminant from a humid gas carrier stream. The improvement in such process comprises the steps of passing the humid contaminant-laden gas through a first adsorber until the organic contaminant is detected at a preset "breakthrough" level in the outlet gas. The outlet gas from the first adsorber is then passed through a second adsorber until the level of organic contaminant is determined to be at approximately the level of organic contaminant in the humid contaminant-laden gas being passed into the first adsorber, and at which point part of the less well-adsorbed water has passed into the outlet gas of the first adsorber. At such time, passage of the humid contaminant-laden gas into the first adsorber is discontinued and, instead, the humid contaminant-laden gas is passed into the second adsorber. During passage of the humid contaminant-laden gas into the second adsorber, the first adsorber, now loaded only with organic contaminant is regenerated. The humid contaminant-laden gas is passed into the second adsorber until the contaminant in the outlet gas from the second adsorber reaches the breakthrough level, at which time the process may be continued by passing the outlet gas from the second bed into the regenerated first bed.

5 Claims, 1 Drawing Sheet

WATER REMOVAL FROM HUMID GASES LADEN WITH ORGANIC CONTAMINANTS BY SERIES ADSORPTION

BACKGROUND OF THE INVENTION

The present invention broadly relates to the recovery of organic compounds that contaminate industrial gas streams and more particularly to an improved recovery scheme that operates with humid contaminated gas streams.

The widespread use of solvents in industrial applications has resulted in increased emissions of volatile organic compounds (VOCs) into the atmosphere, giving rise to environmental concerns and prompting stricter legislative controls on such emissions. As a consequence, manufactures of pharmaceuticals, coated products, textiles, and polymer composites and foams, as well as hydrocarbon producers and distributors, face a dilemma in removing VOCs from process gas streams in that, owing to rising energy prices, recovery costs are very often higher than the value of the VOCs recovered, even in light of rising solvent prices. This dilemma has led to inquiries into more profitable methods of recovering condensable organic vapors from process gas streams.

Conventional adsorption systems for solvent recovery from humid air typically are operated until the solvent concentration in the outlet gas stream reaches a detectable preset breakthrough level whereupon the gas flow to the adsorber is stopped. The adsorbent bed then contains solvent, other condensible organic contaminants, and some amount of water which depends on the inlet relative humidity of the solvent laden gas stream. At this point, present-day techniques involve the introduction of steam, either saturated or superheated, which displaces the solvent from the adsorbent to produce a solvent/water mixture upon condensation.

More recent technology for regenerating and recovering solvent from adsorbent beds involves the use of inert gases (though for some solvents, air also can be used) and low temperature condensation of the solvent from the regenerating gas. The low temperature required for solvent condensation at high efficiency results in water freezing in some part of the system. To avoid ice formation, various water selective dryers have been employed for drying the air stream while permitting passage of the solvent laden air for low temperature condensation, such as achieved by either the Rankin and/or Brayton cycle processes (see U.S. Pat. No. 4,480,393, for example). However, the use of such dryers increases both the capital costs of the installation and the time required for the completion of the regeneration step, as well as the regeneration of the dryer can result in solvent releases.

Also, for continuous processes, typically two adsorber beds are used, where one is adsorbing while the other bed undergoes regeneration. Any increase in the time required for the regeneration of the first bed requires additional adsorption time on the adsorbing bed to assure that the second bed still efficiently adsorbs while the first bed is being regenerated. Therefore, any time increase in the regeneration of the first bed requires a larger second bed, and vice versa.

BROAD STATEMENT OF THE INVENTION

The present invention broadly is directed to an adsorption process wherein a humid gas laden with a condensible organic contaminant is passed in contact with a first bed of solid adsorbent housed in a first adsorber until solvent is detected at a predetermined or "breakthrough" level in the gas withdrawn therefrom at which point part of the less well-adsorbed water has passed into the exhaust of the first adsorber, then the humid contaminant-laden gas is passed in contact with a second bed of solid adsorbent housed in a second adsorber while said first bed, which contains only solvent (all of the water being released to exhaust and the second bed), is regenerated. The improvement in such process comprises the steps of passing said humid contaminant-laden gas through said first adsorber until said organic contaminant is detected at a preset level in the outlet gas from said adsorber whereupon the outlet gas from the first adsorber is passed through said second adsorber until the level of said organic contaminant in said first adsorber outlet gas is determined to be approximately the level of said organic contaminant in said humid contaminant-laden gas passed into said first adsorber. At such time, the humid contaminant-laden gas is discontinued from being passed into the first adsorber and, instead, is passed into said second adsorber while the first bed at that time being loaded only with organic contaminant is being regenerated. The process then can continue until the breakthrough level from the second bed is reached, at which time the outlet gas from the second bed then is passed into the regenerated first bed and the process continued. By operating the adsorption process in the first bed until the adsorbent is nearly saturated with the organic contaminant, the organic contaminant effectively is stripping the water from the first bed and releasing water eventually into the exhaust. This means that the first bed can be regenerated at temperatures below the freezing point of water without fear of frost developing in any process equipment. Thus, the adsorption process of the solvent itself is used to dry the adsorbent from its less strongly adsorbed water content.

The drawings will be described in detail in connection with the description that follows.

DETAILED DESCRIPTION OF THE INVENTION

Figure 1:
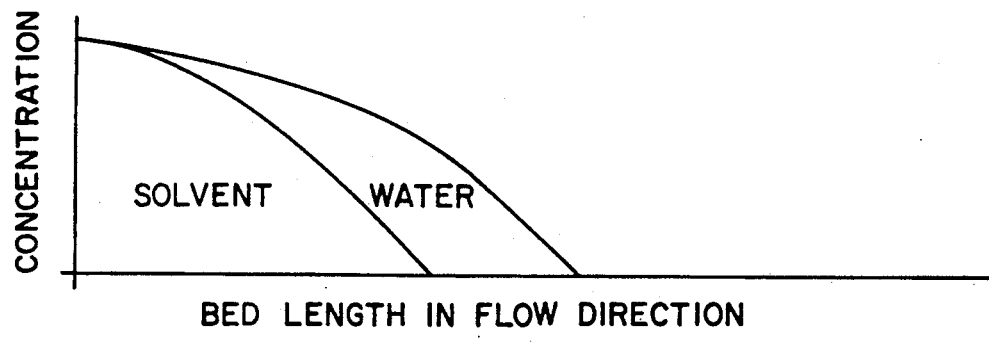
FIG. 1 is a diagrammatic representation of the condensible organic solvent and water contents of the adsorbent where the bed length and flow duration is plotted against the condensible organic contaminant and water concentrations during the early stage of the adsorption process.
Figure 2:
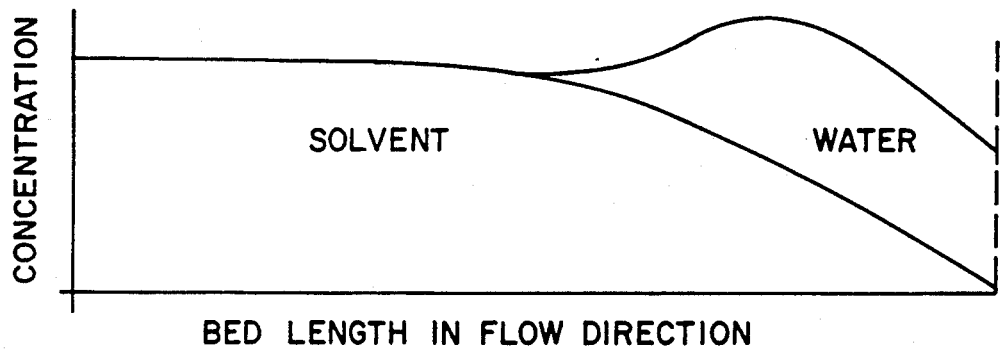
FIG. 2 is a diagrammatic representation like FIG. 1 at the time that breakthrough of solvent in the outlet gas stream is detected.

Initial adsorption by the first bed housed in the first adsorber is conducted in conventional fashion with both condensible organic contaminant, e.g. solvent, and water being adsorbed in the bed, such as illustrated at FIG. 1. Adsorption in the first bed is continued until breakthrough of contaminant at a predetermined level occurs, such as illustrated at FIG. 2. The predetermined level can be the first detectable presence of the solvent or a higher level, depending upon the level at which the contaminant can be present in the outlet gas withdrawn from the first adsorber. At this time, part of the water is released to the exhaust.

At contaminant breakthrough, the gas withdrawn from the first bed, containing part of the water and contaminant, then is passed into a second adsorber housing a second bed of particulate adsorbent. This series adsorber scheme ensures that the gas withdrawn from the second bed will be free of organic contaminant.

Figure 3:
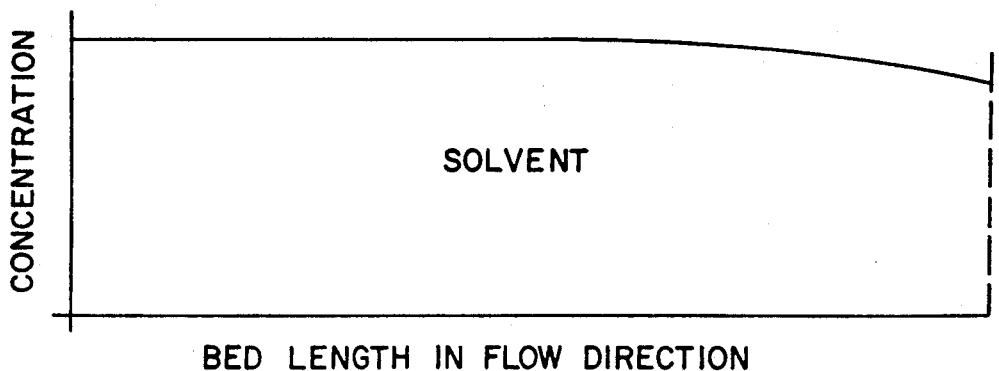
FIG. 3 is a diagrammatic representation like FIGS. 1 and 2 at the time that the bed is withdrawn from service for regeneration.

The series adsorber scheme is continued until the organic contaminant concentration in the gas withdrawn from the first adsorber is determined to be near the inlet concentration of the organic contaminant, as illustrated at FIG. 3. It will be obserbed that the water content in the first bed has been displaced by the organic contaminant adsorbed by the particulate adsorbent since conventional adsorbents (e.g. activated carbon and the like) prefer organic material to water. When the condition depicted at FIG. 3 has been reached, the contaminated gas no longer is passed into the first bed, but is entirely diverted for passing into the second bed which is in a condition as depicted at FIG. 1.

The first bed now can be subjected to regeneration utilizing an inert gas (or even air upon occasion) utilizing a variety of recovery schemes, such as set forth in U.S. Pat. Nos. 4,295,282, 4,480,393, and 4,539,816, the disclosures of which are expressly incorporated herein by reference. The inert gas which strips the first bed then can be subjected to temperatures well below the freezing point of water for efficiently and effectively condensing the organic contaminant from the inert gas stream without worrying about frost and unwanted ice formation.

Organic contaminant stripping of the gas stream by the second adsorber is continued until its condition is represented by FIG. 2. At this point, the outlet gas stream from the second adsorber bed then is passed into the regenerated first adsorbent bed or a third adsorber, depending upon bed size, gas flow, organic contaminant level, and other factors well known to those skilled in this art. The process then continues for the second adsorber until its condition is as represented at FIG. 3 whereupon all of the contaminated gas stream is diverted to the first adsorber. Thus, only one adsorber is used part of the time and both adsorbers are used in series part of the time in order to cleanse a contaminated gas stream laden with condensible organic contaminant. It will be appreciated that each "adsorber" described above could be more than one adsorber, e.g. parallelly or series connected, for additional treating capacity and/or time.

I claim:

1. In an adsorption process wherein a humid gas laden with a condensable organic contaminant is passed in contact with a first bed of solid adsorbent housed in a first adsorber until solvent is detected at a predetermined level in the gas withdrawn therefrom, and the humid contaminant-laden gas then passed in contact with a second bed of solid adsorbent housed in a second adsorber while said first bed is regenerated, the improvement which comprises the steps of:

(a) passing said humid contaminant-laden gas through said first adsorber until said organic contaminant is detected at a preset level in the outlet gas from said adsorber;

(b) passing said outlet gas from said first adsorber in step (a) through said second adsorber until said organic contaminant in said first adsorber outlet gas is determined to be at an approximately equal level to said organic contaminant in said humid contaminant-laden gas passed into said first adsorber;

(c) discontinuing passing said humid contaminant-laden gas into said first adsorber when said approximately equal level is determined, and instead passing said humid contaminant-laden gas into said second adsorber, and (d) regenerating said first bed while passing said humid contaminant-laden gas into said second adsorber.

2. The process of claim 1 wherein said solid adsorbent comprises activated carbon.

3. The process of claim 1 wherein said humid gas comprises an inert gas.

4. The process of claim 1 wherein said humid gas comprises air.

5. The process of claim 1 wherein said solid adsorbent is formed of a material which more strongly adsorbs said organic contaminant than it adsorbs water.

* * * * *